(No Model.)
E. S. JOHNSON.
FOUNTAIN PEN FEEDER.
No. 440,712. Patented Nov. 18, 1890.
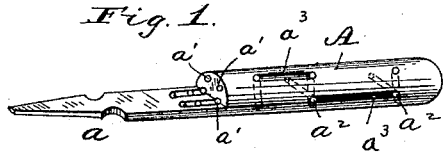
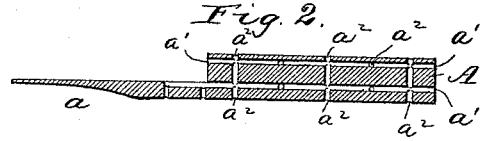
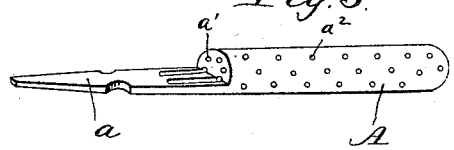
Witnesses:-
D. H. Curry.
E. K. Sturtevant.
Inventor:-
E. S. Johnson
by Smith & Low
attorneys.

UNITED STATES PATENT OFFICE.

EPHRAIM S. JOHNSON, OF YONKERS, NEW YORK.

FOUNTAIN-PEN FEEDER.

SPECIFICATION forming part of Letters Patent No. 440,712, dated November 18, 1890.

Application filed April 30, 1890. Serial No. 350,076. (No model.)

*To all whom it may concern:*

Be it known that I, EPHRAIM S. JOHNSON, a citizen of the United States, residing at Yonkers, in the county of Westchester and State of New York, have invented certain new and useful Improvements in Feeders for Fountain-Pens; and I do declare the following to be a full, clear, and exact description of the invention, such as will enable others skilled in the art to which it appertains to make and use the same.

It is the object of my invention to provide a simple and inexpensive feeder for fountain-pens which when interposed between the reservoir and pen will cause the flow of ink from the former to the latter to be ample for ordinary use, regular in quantity, and yet so governed that the liability of the pen to bleed and blot, or, on the other hand, to become clogged, will be done away with or materially lessened.

It is a further object of my invention to provide for increasing or diminishing the flow by a simple adjustment of the feeder. I have, moreover, so constructed the feeder that it is adapted for use with many forms of holders or reservoirs.

With these objects in view my invention consists in the construction or in any different construction which is the equivalent thereof, hereinafter more particularly set forth and claimed.

In order to make my invention more clearly understood I have shown in the accompanying drawings means for carrying the same into practical effect. In said drawings—

Figure 1 is a perspective view of a fountain-pen feeder enbodying my invention. Fig. 2 is a longitudinal section of the same. Fig. 3 is a transverse section. Fig. 4 is a sectional view of the feeder combined with a pen and reservoir. Fig. 5 is a view of a modified form of feeder.

It will be understood that the feeder has been shown upon an enlarged scale for the sake of clearness of illustration.

Referring to the drawings, A indicates the main body of the feeder in the form of a cylindrical plug adapted to fit neatly within the lower or delivery end of the reservoir with which it is to be used. It may be formed of any suitable material—such, for instance, as hard rubber. At its lower or forward end it is cut away, as shown, so as to leave a tip or tongue $a$, adapted to conform to or fit the pen and conduct the ink thereto. This tongue has a width preferably equal to about one-third of the periphery of the feeder-body.

$a'$ indicates a hole or holes formed near the outer surface of and extending longitudinally within the body A from the delivery end and opening through said body so as to communicate with the interior of the reservoir with which the feeder may be combined. Said hole or holes may open through the inner end surface of the feeder or through its periphery by way of lateral holes $a^2$, or in both of said ways. By providing a series of lateral holes $a^2$ at different distances from the end of the feeder, and by making the latter longitudinally adjustable within the holder or reservoir, (see dotted lines in Fig. 4,) I am enabled to increase or retard the flow of ink by moving the feeder inward or outward and thereby uncovering more or less of said lateral holes for the passage of ink and air.

In Fig. 4 I have shown a feeder embodying my improvements in combination with a pen P and holder or reservoir R, the feeder being adjustable within the latter, as above described. A plurality of relatively fine or small (I have found holes of the diameter of an ordinary pin to be a good average size, though this will depend upon the thickness or fluidity of the ink) longitudinal holes through the feeder, with or without the separated lateral holes or the feature of adjustability within the reservoir, will give a divided, regular, and materially improved feed, and I claim such construction.

Short grooves $a^3$ may be formed on the periphery of the feeder leading to the transverse or lateral holes $a^2$ to give the proper direction to and facilitate the passage of the ink.

It will be understood that the feeder may be adapted to top or under feed, as may be desired.

Having thus described my invention, what I claim, and desire to secure by Letters Patent of the United States, is—

1. As an improved article of manufacture, a fountain-pen feeder provided with one or more longitudinal holes and a series of lateral holes communicating therewith and longitudinally adjustable within an ink-reservoir to increase or diminish the flow, substantially as set forth.

2. As an improved article of manufacture, a fountain-pen feeder consisting of a cylindrical body A, partially cut away to form a tongue $a$, adapted to fit the pen, and having a plurality of longitudinal holes and a plurality of lateral holes, substantially as set forth.

3. In a fountain-pen, the combination, with the pen and reservoir, of a feeder A, having a tongue $a$ and a plurality of longitudinal holes $a'$ and a plurality of lateral holes $a^2$, substantially as set forth.

4. In a fountain-pen, the herein-described feeder, having a portion cut away longitudinally and having a plurality of longitudinal perforations within the body of the feeder and near its surface, substantially as set forth.

5. In a fountain-pen, the herein-described feeder, consisting of a body A, having formed within it a series of fine longitudinal perforations $a'$ and a series of transverse intersecting perforations $a^2$, substantially as set forth.

6. In a fountain-pen, the herein-described feeder, consisting of a body A, having formed within it a series of fine longitudinal perforations $a'$, substantially as set forth.

In testimony whereof I affix my signature in presence of two witnesses.

EPHRAIM S. JOHNSON.

Witnesses:
 H. V. TERHUNE,
 RICHARD BANSE.